United States Patent
Altintas et al.

(10) Patent No.: US 11,516,668 B2
(45) Date of Patent: Nov. 29, 2022

(54) OUT-OF-BAND AUTHENTICATION FOR VEHICULAR COMMUNICATIONS USING JOINT AUTOMOTIVE RADAR COMMUNICATIONS

(71) Applicant: Toyota Motor Engineering & Manufacturing North America, Inc., Plano, TX (US)

(72) Inventors: Onur Altintas, Mountain View, CA (US); Ceyhun D. Ozkaptan, Mountain View, CA (US); John Kenney, Mountain View, CA (US)

( * ) Notice: Subject to any disclaimer, the term of this patent is extended or adjusted under 35 U.S.C. 154(b) by 70 days.

(21) Appl. No.: 16/986,040

(22) Filed: Aug. 5, 2020

(65) Prior Publication Data

US 2022/0046420 A1 Feb. 10, 2022

(51) Int. Cl.
*H04W 4/46* (2018.01)
*H04W 12/106* (2021.01)
*H04W 12/75* (2021.01)

(52) U.S. Cl.
CPC .......... *H04W 12/106* (2021.01); *H04W 4/46* (2018.02); *H04W 12/75* (2021.01)

(58) Field of Classification Search
CPC ...... H04W 12/106; H04W 12/75; H04W 4/46
See application file for complete search history.

(56) References Cited

U.S. PATENT DOCUMENTS

| | | | |
|---|---|---|---|
| 9,043,602 B1* | 5/2015 | Krieger | H04L 63/123 |
| | | | 713/181 |
| 9,672,734 B1 | 6/2017 | Ratnasingam | |
| 9,769,658 B2 | 9/2017 | Dolev | |
| 10,440,096 B2 | 10/2019 | Sabella et al. | |
| 2018/0146323 A1 | 5/2018 | Tseng et al. | |
| 2018/0241810 A1 | 8/2018 | Lerzer et al. | |
| 2021/0306277 A1* | 9/2021 | Yamashiro | H04L 47/32 |

OTHER PUBLICATIONS

Lee, Euisin et al., "Vehicular Cloud Networking: Architecture and Design Principles," IEEE Communications Magazine, Feb. 2014, pp. 148-155.
Jiru, Josef et al., "Data Aggregation in VANATs: a generalized framework for channel load adaptive schemes," 39th Annual IEEE Conference on Load Computer Networks, 2014, pp. 394-397.

(Continued)

*Primary Examiner* — Brian F Shaw
(74) *Attorney, Agent, or Firm* — Burbage Law, P.C.; Jon-Michael Burbage

(57) ABSTRACT

Described herein are embodiments that provide out-of-band authentication for vehicular communications using Joint Automotive Radar Communications ("JARC" if singular, "JARCs" if plural). A method includes receiving, by a directional radio of a connected vehicle, a directional communication having a payload that includes the first temporary identifier and sensor data for a purported transmitter of the directional communication. The method includes initiating, by the directional radio and a radar of the connected vehicle, a set of JARCs with the purported transmitter to determine an authenticity status of the first temporary identifier. The method includes executing a vehicular action for the payload of the directional communication responsive to the authenticity status.

20 Claims, 7 Drawing Sheets

(56) References Cited

OTHER PUBLICATIONS

Sevlian, Raff et al., "Channel Characterization for 700 MHz DSRC Vehicular Communication," Journal of Electrical and Computer Engineering, 2010, 9 pages.

Yan, Shuxian, "Analysis and Detecting of Misbehaviors in VANETs," Technical Report RHUL-MA-2014-4, Sep. 1, 2014, 53 pages.

\* cited by examiner

OUT-OF-BAND AUTHENTICATION FOR VEHICULAR COMMUNICATIONS USING JOINT AUTOMOTIVE RADAR COMMUNICATIONS

BACKGROUND

The specification relates out-of-band authentication for vehicular communications using Joint Automotive Radar Communications ("JARC" if singular, "JARCs" if plural).

The following technologies are well known in the art: public key cryptography; Public Key Infrastructures (PKI); Vehicle-to-Everything (V2X); millimeter Wave communication (mmWave); and JARC.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions.

One general aspect includes a method for out-of-band authentication of a first temporary identifier, the method including: receiving, by a directional radio of a connected vehicle, a directional communication having a payload that includes the first temporary identifier and sensor data for a purported transmitter of the directional communication; initiating, by the directional radio and a radar of the connected vehicle, a set of JARCs with the purported transmitter to determine an authenticity status of the first temporary identifier; and executing a vehicular action for the payload of the directional communication responsive to the authenticity status. Other embodiments of this aspect include corresponding computer systems, apparatus, and computer programs recorded on one or more computer storage devices, each configured to perform the actions of the methods.

Implementations may include one or more of the following features. The method where: the authenticity status is negative based on the set of JARCs indicating that a second temporary identifier received based on the set of JARCs does not match the first temporary identifier; and the vehicular action includes ignoring the payload based on the authenticity status being negative which indicates misbehavior by the purported transmitter. The method where the vehicular action further includes ignoring future communications that include one or more of the first temporary identifier and the second temporary identifier. The method where the directional communication is received by the directional radio in a millimeter wave band and further including determining a receipt status of a second omnidirectional message including a second temporary identifier for the purported transmitter, where the second omnidirectional message is required to be received by a omnidirectional radio of the connected vehicle via a directional communication in a band which is outside of the millimeter wave band. The method where: the receipt status is negative based on the second temporary identifier not being received; and the vehicular action includes ignoring the payload based on the receipt status being negative. The method where: the receipt status is negative based on the second temporary identifier being received in the millimeter wave band; and the vehicular action includes ignoring the payload based on the receipt status being negative. The method further including comparing the first temporary identifier to the second temporary identifier, where: the receipt status is negative based on the second temporary identifier not matching the first temporary identifier; and the vehicular action includes ignoring the payload based on the receipt status being negative. The method further including estimating a second channel response of the second omnidirectional message and comparing the second channel response with a first channel response of a previously received omnidirectional message, where: the receipt status is negative based on the second channel response not matching the first channel response; and the vehicular action includes ignoring the payload based on the receipt status being negative. The method where the sensor data describes a location and a velocity of the purported transmitter and the set of JARCs are operable to verify the location and the velocity described by the sensor data. The method where the purported transmitter is a non-vehicular endpoint. Implementations of the described techniques may include hardware, a method or process, or computer software on a computer-accessible medium.

One general aspect includes a computer program product installed in an onboard unit of a connected vehicle, the computer program product including codes and routines that are operable, when executed by the onboard unit, to cause the onboard unit to execute routines including: receiving, by a directional radio of a connected vehicle, a directional communication having a payload that includes a first temporary identifier and sensor data for a purported transmitter of the directional communication; initiating, by the directional radio and a radar of the connected vehicle, a set of JARCs with the purported transmitter to determine an authenticity status of the first temporary identifier; and executing a vehicular action for the payload of the directional communication responsive to the authenticity status. Other embodiments of this aspect include corresponding computer systems, apparatus, and computer programs recorded on one or more computer storage devices, each configured to perform the actions of the methods.

Implementations may include one or more of the following features. The computer program product where: the authenticity status is negative based on the set of JARCs indicating that a second temporary identifier received based on the set of JARCs does not match the first temporary identifier; and the vehicular action includes ignoring the payload based on the authenticity status being negative which indicates misbehavior by the purported transmitter. The computer program product where the vehicular action further includes ignoring future communications that include one or more of the first temporary identifier and the second temporary identifier. The computer program product where the directional communication is received by the directional radio in a millimeter wave band and further including determining a receipt status of a second omnidirectional message including a second temporary identifier for the purported transmitter, where the second omnidirectional message is required to be received by a omnidirectional radio of the connected vehicle via a directional communication in a band which is outside of the millimeter wave band. The computer program product where: the receipt status is negative based on the second temporary identifier not being received; and the vehicular action includes ignoring the payload based on the receipt status being negative. Implementations of the described techniques may include hardware, a method or process, or computer software on a computer-accessible medium.

One general aspect includes a system of a connected vehicle including: a processor communicatively coupled to a non-transitory memory, a directional radio, and a radar of the connected vehicle, where the processor is operable to retrieve computer-executable code from the non-transitory memory which is operable, when executed by the processor, to cause the processor to: receive, by the directional radio, a directional communication having a payload that includes a first temporary identifier and sensor data for a purported transmitter of the directional communication; initiate, by the directional radio and the radar, a set of JARCs with the purported transmitter to determine an authenticity status of the first temporary identifier; and execute a vehicular action for the payload of the directional communication responsive to the authenticity status. Other embodiments of this aspect include corresponding computer systems, apparatus, and computer programs recorded on one or more computer storage devices, each configured to perform the actions of the methods.

Implementations may include one or more of the following features. The system where: the authenticity status is negative based on the set of JARCs indicating that a second temporary identifier received based on the set of JARCs does not match the first temporary identifier; and the vehicular action includes ignoring the payload based on the authenticity status being negative which indicates misbehavior by the purported transmitter. The system where the vehicular action further includes ignoring future communications that include one or more of the first temporary identifier and the second temporary identifier. The system where the directional communication is received by the directional radio in a millimeter wave band and further including determining a receipt status of a second omnidirectional message including a second temporary identifier for the purported transmitter, where the second omnidirectional message is required to be received by a omnidirectional radio of the connected vehicle via a directional communication in a band which is outside of the millimeter wave band, where the omnidirectional radio is communicatively coupled to the processor. Implementations of the described techniques may include hardware, a method or process, or computer software on a computer-accessible medium.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
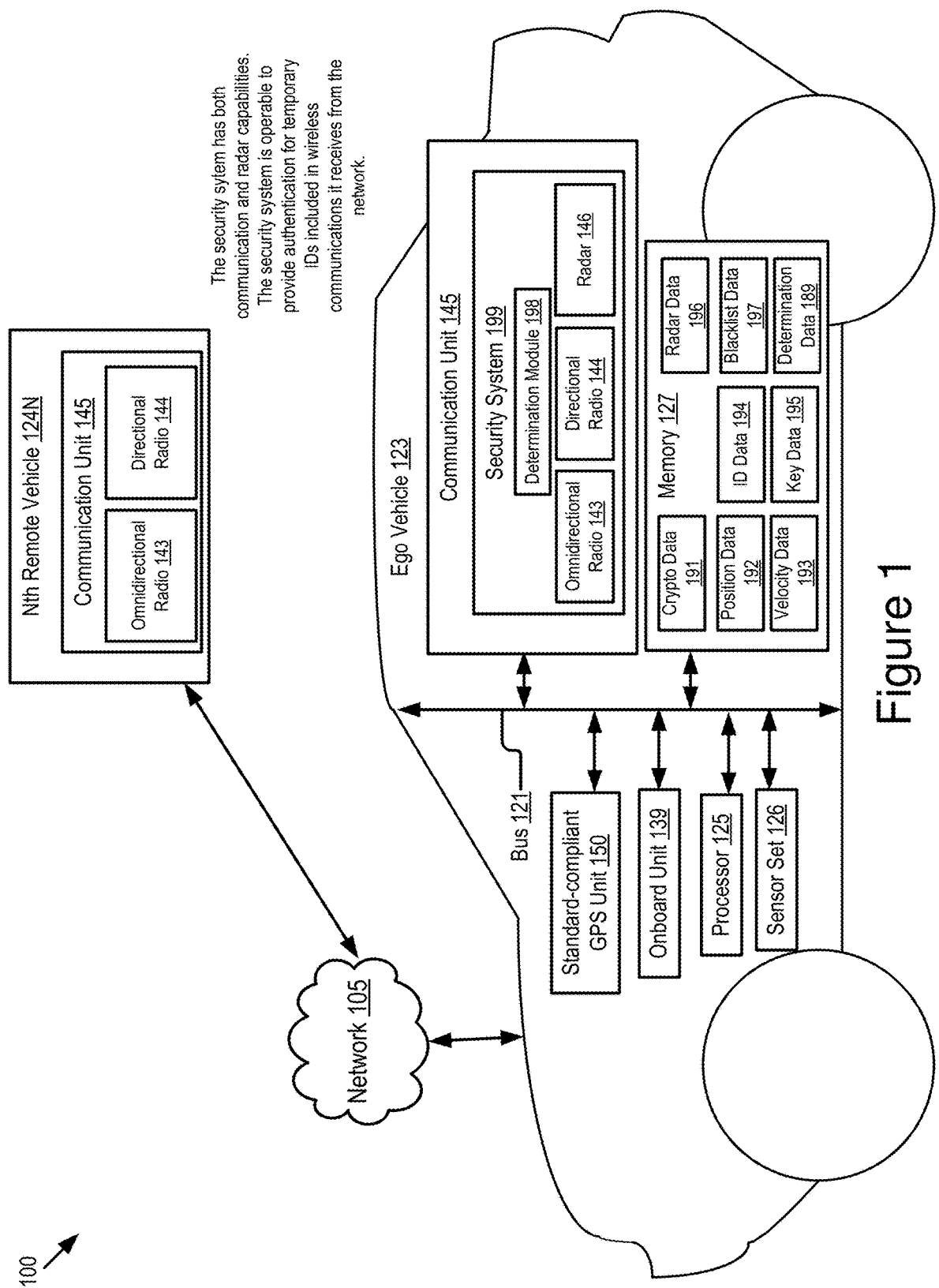
FIG. 1 is a block diagram illustrating an operating environment for a security system according to some embodiments.

Examples of V2X communication include Dedicated Short-Range Communication (DSRC) and Basic Safety Messages (BSMs). Vehicles that transmit DSRC, BSM or JARC communications include a temporary ID in each of these communications. For example, each BSM includes a temporary ID of the vehicle that originally broadcasts that BSM. A purpose of this temporary ID is to uniquely identify the transmitter of the communication while providing anonymity to the transmitter.

A problem is that there are situations where the transmitter needs to be identified and this identification process is difficult. Solving this problem is important for the purpose of providing security for vehicular communications, identifying misbehaving entities, and taking action to eliminate the threat of misbehaving entities.

As used herein, the term "vehicle" refers to a connected vehicle that includes a communication unit that enables the connected vehicle to send and receive wireless messages via one or more vehicular networks. Accordingly, as used herein, the terms "vehicle" and "connected vehicle" may be used interchangeably.

As used herein, the term "omnidirectional communications" refers to omnidirectional V2X communications such as Wi-Fi, DSRC, BSM, LTE, LTE-V2V, 3G, 4G, 5G, cellular, and any other omnidirectional wireless communication. JARC and mmWave are not omnidirectional communications.

As used herein, the term "directional communications" refer to mmWave communications, JARC, and any other directional wireless communication. For example, JARC via mmWave communications is an example of a directional communication. However, the omnidirectional communications listed in the preceding paragraph are not directional communications. In some embodiments, directional communications are required to operate in the mmWave radar spectrum. In some embodiments, directional communications are required to not operate in the mmWave radar spectrum.

Described herein are embodiments of a security system. In some embodiments, the security system includes code and routines that are operable, when executed by a processor of a vehicle, to cause the processor to execute steps that provide some or all of the following example functionality:

(1) with regard to omnidirectional communications (e.g., Wi-Fi, DSRC, BSM, LTE, LTE-V2V, 3G, 4G, 5G, other forms of cellular communication, etc.), functionality to match temporary IDs with the vehicles which are anonymously identified by these temporary IDS;

(2) with regard to directional communications (e.g., JARC via mmWave), functionality to match temporary IDs with the vehicles which are anonymously identified by these temporary IDS; and (3) a radar-verified key exchange protocol for directional communications (e.g., JARC via mmWave) that are operating in the mmWave radar spectrum.

An example of the security system is now described for omnidirectional communications according to some embodiments. Assume a V2X-equipped vehicle that is referred to as the omnidirectional transmitter and another V2X-equipped vehicle that is referred to as the ego vehicle. The omnidirectional transmitter broadcasts a omnidirectional message that includes, among other things, two types of information: (1) a temporary ID that identifies the omnidirectional transmitter in an anonymous and unique fashion; and (2) location information which purports to describe the location of the omnidirectional transmitter with lane-level accuracy. So, in theory, the ego vehicle can use the location information of the omnidirectional transmitter in conjunction with (1) the location of the ego vehicle [which is known by the ego vehicle's own GPS] and radar measurements or some other range-finding measurements to identify which of the vehicles around the ego vehicle is actually the transmitter of the omnidirectional message, and thus identify the omnidirectional transmitter if they are behaving badly. However, this is not true in practice, because a malicious party that is transmitting malicious omnidirectional messages (e.g., omnidirectional messages whose payloads include inaccurate data) can easily include false location information in the omnidirectional message, thus subverting the ego vehicle's ability to identify which vehicle or other entity is the malicious party.

Example Strategies Executed by the Security System

In some embodiments, the security system problem of identifying misbehaving parties for vehicular communications in the following example ways. See, e.g., strategy 1(a), strategy 1(b), strategy 2(a), and strategy 2(b) described below. One or more of strategies 1(a) and 1(b) are executed by the security system to identify misbehaving directional communications. One or more of strategies 2(a) and 2(b) are executed by the security system to identify misbehaving omnidirectional communications.

In some embodiments, the security system includes codes and routines that are operable, when executed by a processor of a connected vehicle, to cause the processor to execute steps that are consistent with one or more of strategies 1(a), 1(b), 2(a), and 2(b). In some embodiments, a communication unit of the connected vehicle receives a wireless message. The wireless message is either directional or omnidirectional. The processor executes the security system. The security system includes code and routines that are operable, when executed by the processor, to cause the processor to analyze the wireless message to determine whether the wireless message is directional or omnidirectional. For example, the wireless message includes one or more bits of data in its digital data payload that indicates whether the wireless message is directional or omnidirectional. The security system causes the processor to parse the payload, identify the one or more bits of data, determine whether the wireless message is a directional communication or omnidirectional communication, and determine whether to cause the processor to execute steps consistent with one or more of strategies 1(a), 1(b), 2(a), and 2(b) based on this determination and or other factors considered by the security system which are relevant to determining which of the strategies to implement.

In some embodiments, the security system causes the processor to execute steps consistent with one or more of strategies 1(a) and 1(b) if the security system determines that the wireless message is directional. In some embodiments, the security system may determine that steps consistent with both steps 1(a) and 1(b) are executed by the processor and the security system causes the processor to execute these steps.

In some embodiments, the security system causes the processor to execute steps consistent with one or more of strategies 2(a) and 2(b) if the security system determines that the wireless message is omnidirectional. In some embodiments, the security system may determine that steps consistent with both steps 2(a) and 2(b) are executed by the processor and the security system causes the processor to execute these steps.

Directional Communications—Strategies 1(a) and 1(b)

For directional communications, strategies 1(a) and 1(b) may or may not be executed consecutively; in some embodiments, only one of strategy 1(a) or 1(b) are executed by the security system. Strategies 1(a) and 1(b) are now described according to some embodiments.

Strategy 1(a): First, a JARC protocol is executed by a directional radio and radar of a connected vehicle that receives the mmWave message. An example of a directional radio includes a mmWave radio. The mmWave message includes data describing, among other things, a first temporary identifier and sensor data describing the location of the purported transmitter of the mmWave message and the velocity of the purported transmitter. A JARC protocol (see, e.g., FIG. 4 or 5) is configured to verify the sensor data. If the sensor data is not verifiable in this way, then the first temporary identifier for the purported transmitter is blacklisted and its payloads now and in the future are ignored.

Strategy 1(b): Second, an out-of-band verification method may be implemented. For example, the directional message is transmitted inside a mmWave band and received by a mmWave radio of the receiver. In some embodiments, this method requires that all transmitters of directional messages also transmit an omnidirectional message to the recipient in a band that is outside the mmWave band (e.g., a BSM, a DSRC message, or some other omnidirectional V2X message). The omnidirectional message includes a second temporary identifier. The temporary identifier included in the directional message is referred to as a first temporary identifier for clarity. The security system compares the second temporary identifier to the first temporary identifier to determine if they match. See, e.g., the dotted line in the middle of FIG. 3 that says "check DSRC IDs" (note that a DSRC message is an example of an omnidirectional message, but the omnidirectional message is not limited to DSRC and can be any other type of omnidirectional vehicular wireless message). If they do not match, then the first temporary identifier is blacklisted and its payloads now and in the future are ignored. See, e.g., the dotted line at the bottom of FIG. 3 that says "update."

Note, that in some embodiments, strategy 2(a) described below may also be implemented for strategy 1(b) described above for all omnidirectional messages as a further way of verifying the identity of the purported transmitter.

Omnidirectional Communications—Strategies 2(a) and 2(b)

For omnidirectional communications, strategies 2(a) and 2(b) may or may not be executed consecutively; in some embodiments, only one of strategy 2(a) or 2(b) are executed by the security system. Strategies 2(a) and 2(b) are now described according to some embodiments.

Strategy 2(a): The security system estimates the channel response for an omnidirectional message that the connected vehicle receives. In some embodiments, this step is done for each received V2X message, and vehicles that are transmitting V2X messages should be transmitting about ten V2X messages per second because the default transmission rate for Basic Safety Messages (BSMs) is about once every 0.1 seconds. A data structure is formed that includes entries which describe the temporary identifiers included in omnidirectional messages and the channel response for each omnidirectional message. Each time an omnidirectional message is received, its temporary identifier is cross-referenced against the data structure by the security system to determine if the channel response is consistent across the previous channel responses for this temporary identifier. If the channel response varies, then the temporary identifier is blacklisted and its payloads now, and in the future, are ignored by the connected vehicle. See, e.g., the left-hand side of FIG. 3. This approach works because channel response is a unique identifier of a transmitter which is correlates in time and decorrelates in space/position. Accordingly, the channel response is treated by the security system as a second unique temporary identifier of a vehicle; other solutions to this problem do not treat channel response as a second unique temporary identifier of a vehicle that has transmitted an omnidirectional message.

Strategy 2(b): In some embodiments, omnidirectional communications are further verified by the security system using an out-of-band verification method similar to what is described in strategy 1(b) above for directional communications. For example, the omnidirectional message is transmitted in a band that is outside of the mmWave band and received by a V2X radio of the receiver. All transmitters of omnidirectional messages are required to also transmit a directional message to the recipient in a band that is inside the mmWave band (e.g., a mmWave message). The mmWave message includes a second temporary identifier. The temporary identifier included in the omnidirectional message is referred to as a first temporary identifier for clarity. The security system compares the second temporary identifier to the first temporary identifier to determine if they match. See, e.g., the dotted line in the middle of FIG. 3 that is labeled "check DSRC IDs." If they do not match, then the first temporary identifier is blacklisted and its payloads now and in the future are ignored.

Vehicular Action

In some embodiments, a vehicular action includes one or more of the following: blacklisting a temporary identifier; and ignoring the payloads all future wireless communications that include this blacklisted temporary identifier is an example a vehicular action. In some embodiments ignoring a payload for a wireless message includes deleting all digital data included in the payload from a non-transitory memory of the vehicle which receives the wireless communication. Other examples of vehicular actions include, for example, notifying other vehicles of the blacklisted temporary identifier.

DSRC-Equipped Device

A DSRC-equipped device is any processor-based computing device that includes a DSRC transmitter and a DSRC receiver. For example, if a vehicle includes a DSRC transmitter and a DSRC receiver, then the vehicle may be described as "DSRC-enabled" or "DSRC-equipped." Other types of devices may be DSRC-enabled. For example, one or more of the following devices may be DSRC-equipped: an edge server; a cloud server; a roadside unit ("RSU"); a traffic signal; a traffic light; a vehicle; a smartphone; a smartwatch; a laptop; a tablet computer; a personal computer; and a wearable device.

In some embodiments, one or more of the connected vehicles described above are DSRC-equipped vehicles. A DSRC-equipped vehicle is a vehicle that includes a standard-compliant GPS unit and a DSRC radio which is operable to lawfully send and receive DSRC messages in a jurisdiction where the DSRC-equipped vehicle is located. A DSRC radio is hardware that includes a DSRC receiver and a DSRC transmitter. The DSRC radio is operable to wirelessly send and receive DSRC messages on a band that is reserved for DSRC messages.

A DSRC message is a wireless message that is specially configured to be sent and received by highly mobile devices such as vehicles, and is compliant with one or more of the following DSRC standards, including any derivative or fork thereof: EN 12253:2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906:2004 Electronic Fee Collection—Application interface.

A DSRC message is not any of the following: a WiFi message; a 3G message; a 4G, 5G message; an LTE message; a millimeter wave communication message; a Bluetooth message; a satellite communication; and a short-range radio message transmitted or broadcast by a key fob at 315 MHz or 433.92 MHz. For example, in the United States, key fobs for remote keyless systems include a short-range radio transmitter which operates at 315 MHz, and transmissions or broadcasts from this short-range radio transmitter are not DSRC messages since, for example, such transmissions or broadcasts do not comply with any DSRC standard, are not transmitted by a DSRC transmitter of a DSRC radio and are not transmitted at 5.9 GHz. In another example, in Europe and Asia, key fobs for remote keyless systems include a short-range radio transmitter which operates at 433.92 MHz, and transmissions or broadcasts from this short-range radio transmitter are not DSRC messages for similar reasons as those described above for remote keyless systems in the United States.

In some embodiments, a DSRC-equipped device (e.g., a DSRC-equipped vehicle) does not include a conventional global positioning system unit ("GPS unit"), and instead includes a standard-compliant GPS unit. A conventional GPS unit provides positional information that describes a position of the conventional GPS unit with an accuracy of plus or minus 10 meters of the actual position of the conventional GPS unit. By comparison, a standard-compliant GPS unit provides position data that describes a position of the standard-compliant GPS unit with an accuracy of plus or minus 1.5 meters of the actual position of the standard-compliant GPS unit. This degree of accuracy is referred to as "lane-level accuracy" since, for example, a lane of a roadway is generally about 3 meters wide, and an accuracy of plus or minus 1.5 meters is sufficient to identify which lane a vehicle is traveling in even when the roadway has more than one lanes of travel each heading in a same direction.

In some embodiments, a standard-compliant GPS unit is operable to identify, monitor and track its two-dimensional position within 1.5 meters, in all directions, of its actual position 68% of the time under an open sky.

In some embodiments, the security system includes software that is installed in an onboard unit of a vehicle. This vehicle is a connected vehicle that is also equipped with the ability to transmit wireless communications via omnidirectional and directional radios. The vehicle also includes a radar system. In some embodiments, it is a requirement of the security system that the vehicle include a communication unit that includes an omnidirectional radio, a directional radio, and a radar system. The radios and radar system are configured to operate with one another to so that collectively they operable to provide JARC functionality to the vehicle. Examples of omnidirectional radios include one or more of the following: a cellular radio; an LTE-V2X radio; an LTE-D2D radio; a VoLTE radio; a 3G radio; a 4G radio; a 5G radio; a Wi-Fi radio, etc.

Requirements for the Directional Radio

In some embodiments, the directional radio is a JARC radio operating on one or more mmWave radar bands. In some embodiments, the vehicles are equipped with mmWave radar band JARC radios on the front of the vehicle, the back of the vehicle, each side panel of the vehicle so that they include no less than four (4) mmWave radar band JARC radios. In some embodiments less or more mmWave radar band JARC radios are used so long as each vehicle that includes the security system includes at least one mmWave radar band JARC radio.

Embodiments of the security system are now described. Referring now to FIG. 1, depicted is a block diagram illustrating an operating environment 100 for a security system 199 according to some embodiments.

The operating environment 100 may include one or more of the following elements: an ego vehicle 123 (referred to herein as a "vehicle 123" or an "ego vehicle 123"); and an Nth remote vehicle 124 (where "N" refers to any positive whole number greater than one). These elements of the operating environment 100 are communicatively coupled to one another via a network 105. These elements of the operating environment 100 are depicted by way of illustration. In practice, the operating environment 100 may include one or more of the elements depicted in FIG. 1. The Nth remote vehicle 124 is referred to herein as a "remote vehicle 124" or a "vehicle 124." In some embodiments, the operating environment 100 includes a roadside unit, an edge server, a cloud serer, or other similar elements.

In the depicted embodiment, the ego vehicle 123 and the remote vehicle 124 include similar elements. For example, each of these elements of the operating environment 100 include their own processor 125, bus 121, memory 127, communication unit 145, sensor set 126, onboard unit 139, and security system 199. These elements of the ego vehicle 123 and the remote vehicle 124 provide the same or similar functionality relative to one another. Accordingly, these descriptions will not be repeated in this description.

In the depicted embodiment, the ego vehicle 123 and the remote vehicle 124 each store similar digital data. For example, the memory 127 of the ego vehicle 123 may store the digital data depicted in FIG. 1 as stored by the memory 127 of the ego vehicle 123.

The network 105 may be a conventional type, wired or wireless, and may have numerous different configurations including a star configuration, token ring configuration, or other configurations. Furthermore, the network 105 may include a local area network (LAN), a wide area network (WAN) (e.g., the Internet), or other interconnected data paths across which multiple devices and/or entities may communicate. In some embodiments, the network 105 may include a peer-to-peer network. The network 105 may also be coupled to or may include portions of a telecommunications network for sending data in a variety of different communication protocols. In some embodiments, the network 105 includes Bluetooth® communication networks or a cellular communications network for sending and receiving data including via short messaging service (SMS), multimedia messaging service (MMS), hypertext transfer protocol (HTTP), direct data connection, wireless application protocol (WAP), e-mail, DSRC, full-duplex wireless communication, mmWave, WiFi (infrastructure mode), WiFi (ad-hoc mode), visible light communication, TV white space communication and satellite communication. The network 105 may also include a mobile data network that may include 3G, 4G, 5G, LTE, LTE-V2X, LTE-D2D, VoLTE or any other mobile data network or combination of mobile data networks. Further, the network 105 may include one or more IEEE 802.11 wireless networks.

In some embodiments, the network 105 is a V2X network. For example, the network 105 must include a vehicle, such as the ego vehicle 123, as an originating endpoint for each wireless communication transmitted by the network 105. An originating endpoint is the endpoint that initiated a wireless communication using the network 105. In some embodiments, the network 105 is a vehicular network.

In some embodiments, one or more of the ego vehicle 123 and the remote vehicle 124 are DSRC-equipped vehicles. For example, the ego vehicle 123 and the remote vehicle 124 each include a standard-compliant GPS unit 150 and a DSRC radio (e.g., the omnidirectional radio 143 is a DSRC radio in embodiments where the ego vehicle 123 is a DSRC-equipped vehicle). The network 105 may include a DSRC communication channel shared among the ego vehicle 123 and the remote vehicle 124.

The ego vehicle 123 may include a car, a truck, a sports utility vehicle, a bus, a semi-truck, a drone, or any other roadway-based conveyance. In some embodiments, the ego vehicle 123 may include an autonomous vehicle or a semi-autonomous vehicle. Although not depicted in FIG. 1, in some embodiments, the ego vehicle 123 includes an autonomous driving system. The autonomous driving system includes code and routines that provides sufficient autonomous driving features to the ego vehicle 123 to render the ego vehicle 123 an autonomous vehicle or a highly autonomous vehicle. In some embodiments, the ego vehicle 123 is a Level III autonomous vehicle or higher as defined by the National Highway Traffic Safety Administration and the Society of Automotive Engineers.

The ego vehicle 123 is a connected vehicle. For example, the ego vehicle 123 is communicatively coupled to the network 105 and operable to send and receive messages via the network 105.

The ego vehicle 123 includes one or more of the following elements: a processor 125; a sensor set 126; a standard-compliant GPS unit 150; a communication unit 145; an onboard unit 139; a memory 127; and a security system 199. These elements may be communicatively coupled to one another via a bus 121.

The processor 125 includes an arithmetic logic unit, a microprocessor, a general-purpose controller, or some other processor array to perform computations and provide electronic display signals to a display device. The processor 125 processes data signals and may include various computing architectures including a complex instruction set computer (CISC) architecture, a reduced instruction set computer (RISC) architecture, or an architecture implementing a combination of instruction sets. Although FIG. 1 depicts a single processor 125 present in the ego vehicle 123, multiple processors may be included in the ego vehicle 123. The processor 125 may include a graphical processing unit. Other processors, operating systems, sensors, displays, and physical configurations may be possible.

In some embodiments, the processor 125 may be an element of a processor-based computing device of the ego vehicle 123. For example, the ego vehicle 123 may include one or more of the following processor-based computing devices and the processor 125 may be an element of one of these devices: an onboard vehicle computer; an electronic control unit; a navigation system; an advanced driver assistance system ("ADAS system") and a head unit. In some embodiments, the processor 125 is an element of the onboard unit 139.

The onboard unit 139 is a special purpose processor-based computing device. In some embodiments, the onboard unit 139 is a communication device that includes one or more of the following elements: the communication unit 145; the processor 125; the memory 127; and the security system 199. In some embodiments, the onboard unit 139 is the computer system 200 depicted in FIG. 2. In some embodiments, the onboard unit 139 is an electronic control unit (ECU).

The sensor set 126 includes one or more onboard sensors. The sensor set 126 may record sensor measurements that describe the ego vehicle 123 or the physical environment that includes the ego vehicle 123. The sensor data includes digital data that describes the sensor measurements.

In some embodiments, the sensor set 126 may include one or more sensors that are operable to measure the physical environment outside of the ego vehicle 123. For example, the sensor set 126 may include cameras, lidar, radar, sonar and other sensors that record one or more physical characteristics of the physical environment that is proximate to the ego vehicle 123.

In some embodiments, the sensor set 126 may include one or more sensors that are operable to measure the physical environment inside a cabin of the ego vehicle 123. For example, the sensor set 126 may record an eye gaze of the driver (e.g., using an internal camera), where the driver's hands are located (e.g., using an internal camera) and whether the driver is touching a head unit or infotainment system with their hands (e.g., using a feedback loop from the head unit or infotainment system that indicates whether the buttons, knobs or screen of these devices is being engaged by the driver).

In some embodiments, the sensor set 126 may include one or more of the following sensors: an altimeter; a gyroscope; a proximity sensor; a microphone; a microphone array; an accelerometer; a camera (internal or external); a LIDAR sensor; a laser altimeter; a navigation sensor (e.g., a global positioning system sensor of the standard-compliant GPS unit 150); an infrared detector; a motion detector; a thermostat; a sound detector, a carbon monoxide sensor; a carbon dioxide sensor; an oxygen sensor; a mass air flow sensor; an engine coolant temperature sensor; a throttle position sensor; a crank shaft position sensor; an automobile engine sensor; a valve timer; an air-fuel ratio meter; a blind spot meter; a curb feeler; a defect detector; a Hall effect sensor, a manifold absolute pressure sensor; a parking sensor; a radar gun; a speedometer; a speed sensor; a tire-pressure monitoring sensor; a torque sensor; a transmission fluid temperature sensor; a turbine speed sensor (TSS); a variable reluctance sensor; a vehicle speed sensor (VSS); a water sensor; a wheel speed sensor; and any other type of automotive sensor.

The sensor set 126 may be operable to record sensor data that describes the occupancy of a parking space at one or more different times, images or other measurements of the physical environment and objects or other vehicles present in the roadway environment such as pedestrians, animals, traffic signs, traffic lights, pot holes, etc.

The physical environment may include a roadway region, parking lot, or parking garage that is proximate to the ego vehicle 123. The sensor data may describe measurable aspects of the physical environment.

In some embodiments, the sensors of the sensor set 126 are operable to collect sensor data. The sensors of the sensor set 126 include any sensors that are necessary to measure and record the measurements described by a sensor of the sensor set 126.

In some embodiments, the sensor data includes any measurements that are necessary to generate, measure, infer or otherwise determine one or more of the following: the position data 192; the velocity data 193; and the radar data 196. The position data 192 includes digital data that describes the geographical location of the ego vehicle 123 and/or the remote vehicle 124. The velocity data 193 includes digital data that describes the velocity of one or more of the ego vehicle 123 and/or the remote vehicle 124. The radar data 196 includes digital data that describes radar measurements recorded by one or more of the ego vehicle 123 and/or the remote vehicle. In some embodiments, some or all of the digital data stored in the memory 127 may be included as the payload for a wireless message sent or received by the ego vehicle 123. In some embodiments, the wireless message may be an omnidirectional message or a directional message. In some embodiments, the position data 192 and/or the velocity data 193 are the output of the standard-compliant GPS unit 150.

In some embodiments, the wireless messages received from other vehicles may be treated as a form of feedback that: confirms the accuracy of a vehicle's own sensor measurements; is used to improve the accuracy of these sensor measurements; or is used as an input to a learning algorithm that improves the accuracy of a vehicle's sensor measurements over time based on the feedback received from other vehicles.

In some embodiments, the standard-compliant GPS unit 150 includes any hardware and software necessary to make the ego vehicle 123 or the standard-compliant GPS unit 150 compliant with one or more of the following DSRC standards, including any derivative or fork thereof: EN 12253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); and EN 13372:2004 Dedicated Short-Range Communication (DSRC)—DSRC profiles for RTTT applications (review); EN ISO 14906: 2004 Electronic Fee Collection—Application interface.

In some embodiments, the standard-compliant GPS unit 150 is operable to provide position data describing the location of the ego vehicle 123 with lane-level accuracy. For example, the ego vehicle 123 is traveling in a lane of a multi-lane roadway. Lane-level accuracy means that the lane of the ego vehicle 123 is described by the position data so accurately that a precise lane of travel of the ego vehicle 123 may be accurately determined based on the position data for this vehicle 123 as provided by the standard-compliant GPS unit 150.

In some embodiments, the standard-compliant GPS unit 150 includes hardware that wirelessly communicates with a GPS satellite (or GPS server) to retrieve position data that describes the geographic location of the ego vehicle 123 with a precision that is compliant with the DSRC standard. The DSRC standard requires that position data be precise enough to infer if two vehicles (one of which is, for example, the ego vehicle 123) are located in adjacent lanes of travel on a roadway. In some embodiments, the standard-compliant GPS unit 150 is operable to identify, monitor and track its two-dimensional position within 1.5 meters of its actual position 68% of the time under an open sky. Since roadway lanes are typically no less than 3 meters wide, whenever the two-dimensional error of the position data is less than 1.5 meters the security system 199 described herein may analyze the position data provided by the standard-compliant GPS unit 150 and determine what lane the ego vehicle 123 is traveling in based on the relative positions of two or more different vehicles (one of which is, for example, the ego vehicle 123) traveling on a roadway at the same time.

By comparison to the standard-compliant GPS unit 150, a conventional GPS unit which is not compliant with the DSRC standard is unable to determine the location of the ego vehicle 123 with lane-level accuracy.

The communication unit 145 transmits and receives data to and from a network 105 or to another communication channel. In some embodiments, the communication unit 145 may include a DSRC transmitter, a DSRC receiver and other hardware or software necessary to make the ego vehicle 123 a DSRC-equipped device.

In some embodiments, the communication unit 145 includes a port for direct physical connection to the network 105 or to another communication channel. For example, the communication unit 145 includes a USB, SD, CAT-5, or similar port for wired communication with the network 105. In some embodiments, the communication unit 145 includes a wireless transceiver for exchanging data with the network 105 or other communication channels using one or more wireless communication methods, including: IEEE 802.11; IEEE 802.16, BLUETOOTH®; EN ISO 14906:2004 Electronic Fee Collection—Application interface EN 11253: 2004 Dedicated Short-Range Communication—Physical layer using microwave at 5.8 GHz (review); EN 12795:2002 Dedicated Short-Range Communication (DSRC)—DSRC Data link layer: Medium Access and Logical Link Control (review); EN 12834:2002 Dedicated Short-Range Communication—Application layer (review); EN 13372:2004 Dedicated Short-Range Communication (DSRC)—DSRC profiles for RTTT applications (review); the communication method described in U.S. patent application Ser. No. 14/471, 387 filed on Aug. 28, 2014 and entitled "Full-Duplex Coordination System"; or another suitable wireless communication method.

In some embodiments, the communication unit 145 includes a full-duplex coordination system as described in U.S. patent application Ser. No. 14/471,387 filed on Aug. 28, 2014 and entitled "Full-Duplex Coordination System," the entirety of which is incorporated herein by reference.

In some embodiments, the communication unit 145 includes a cellular communications transceiver for sending and receiving data over a cellular communications network including via short messaging service (SMS), multimedia messaging service (MMS), hypertext transfer protocol (HTTP), direct data connection, WAP, e-mail, or another suitable type of electronic communication. In some embodiments, the communication unit 145 includes a wired port and a wireless transceiver. The communication unit 145 also provides other conventional connections to the network 105 for distribution of files or media objects using standard network protocols including TCP/IP, HTTP, HTTPS, and SMTP, millimeter wave, DSRC, etc.

In some embodiments, the communication unit 145 includes one or more of the following: an omnidirectional radio 143; a directional radio 144; and a radar 146.

The omnidirectional radio 143 is a hardware unit that includes one or more transmitters and one or more receivers that is operable to send and receive any type of wireless omnidirectional communication.

In some embodiments, the omnidirectional radio 143 includes a DSRC transmitter and a DSRC receiver. The DSRC transmitter is operable to transmit and broadcast DSRC messages over the 5.9 GHz band. The DSRC receiver is operable to receive DSRC messages over the 5.9 GHz band. In some embodiments, the DSRC transmitter and the DSRC receiver operate on some other band which is reserved exclusively for DSRC.

In some embodiments, the omnidirectional radio 143 periodically broadcasts Basic Safety Messages ("BSM message" if singular, or "BSM messages" if plural) as described by the DSRC standard or some similar standard. In some embodiments, the communication unit 145 includes a non-transitory memory which stores digital data that controls the frequency for broadcasting BSM messages. In some embodiments, the non-transitory memory stores a buffered version of the position data for the ego vehicle 123 so that the position data for the ego vehicle 123 is broadcast as an element of the BSM messages which are regularly broadcast by the omnidirectional radio 143 (e.g., at an interval of once every 0.10 seconds). An example of the digital data that is included in a BSM message includes some or all of the digital data depicted in FIG. 1 as being stored by the memory 127 of the ego vehicle 123.

In some embodiments, the omnidirectional radio 143 includes any hardware or software which is necessary to make the ego vehicle 123 compliant with the DSRC standards. In some embodiments, the standard-compliant GPS unit 150 is an element of the omnidirectional radio 143.

The directional radio 144 is a hardware unit that includes one or more transmitters and one or more receivers that is operable to send and receive any type of wireless directional communication.

In some embodiments, the directional radio 144 is a JARC radio operating on one or more mmWave radar bands. In some embodiments, the ego vehicle 123 and the remote vehicle 124 are equipped with mmWave radar band JARC radios on their fronts, their backs, and on each side so that they include no less than four (4) mmWave radar band JARC radios. In some embodiments less or more mmWave radar band JARC radios are used so long as each vehicle that includes the security system 199 includes at least one mmWave radar band JARC radio.

The radar 146 includes a hardware radar system. The radar 146 is operable to send and receive radar pings and record sensor data describing radar measurements which are determinable based on received radar pings.

In some embodiments, the radar 146 is a detection system that uses radio waves to determine the range, angle, or velocity of objects. In some embodiments, the radar 146 is operable to detect objects, weather formations/conditions, and terrain within a roadway environment that includes the ego vehicle 123 and/or the remote vehicle 124. In some embodiments, the radar 146 includes a transmitter producing electromagnetic waves in the radio or microwaves domain, a transmitting antenna, a receiving antenna, a receiver, and processor to determine properties of the object which reflect the electromagnetic waves. Radio waves (pulsed or continuous) from the transmitter reflect off the object and return to the receiver, giving information about the object's location and speed. In some embodiments, a same antenna is used as both the transmitting antenna and the receiving antenna.

The memory 127 is a non-transitory storage medium. The memory 127 stores instructions or data that may be executed by the processor 125. The instructions or data include code for performing the techniques described herein.

In some embodiments, the memory 127 is one or more of a dynamic random-access memory (DRAM) device, a static random-access memory (SRAM) device, flash memory, or some other memory device. In some embodiments, the memory 127 includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the memory 127 stores any or all of the digital data or information described herein.

As depicted in FIG. 1, the memory 127 stores the following digital data: cryptography data 191 ("crypto data 191"); position data 192; velocity data 193; identification data 194 ("ID data 194"); key data 195; radar data 196; blacklist data 197; and determination data 189.

In some embodiments, the memory 127 also stores sensor data. The sensor data includes any sensor measurement recorded by the sensor set 126 and/or any sensor measurements that are included in the payload of a non-blacklisted wireless message received by the communication unit 145. In some embodiments, the position data 192, velocity data 193, and radar data 196 are included in the sensor data.

In some embodiments, the security system 199 includes code and routines that are operable, when executed by the processor 125, to cause the processor 125 to: execute or activate one or more sensors of the sensor set 126 to cause to record the sensor measurements that are described by the sensor data; and store these sensor measurements as the sensor data in the memory 127.

In some embodiments, the memory 127 also stores message data. Message data is digital data that describes the payload for a wireless message (e.g., a directional communication and/or an omnidirectional communication) transmitted or received by the ego vehicle 123.

The crypto data 191 includes digital data that describes information necessary to provide cryptographic functionality. In some embodiments, the crypto data 191 includes digital data that describes algorithms used to generate one or more of the ID data 194 and the key data 195. In some embodiments, the crypto data 191 includes digital data that describes public cryptographic data (e.g., a public key or some other digital data necessary for shared secret key generation). In some embodiments, the crypto data 191 includes digital data that describes private cryptographic data (e.g., a public key or some other digital data necessary for shared secret key generation). In some embodiments, the crypto data 191 includes a digital certificate.

Figure 5:
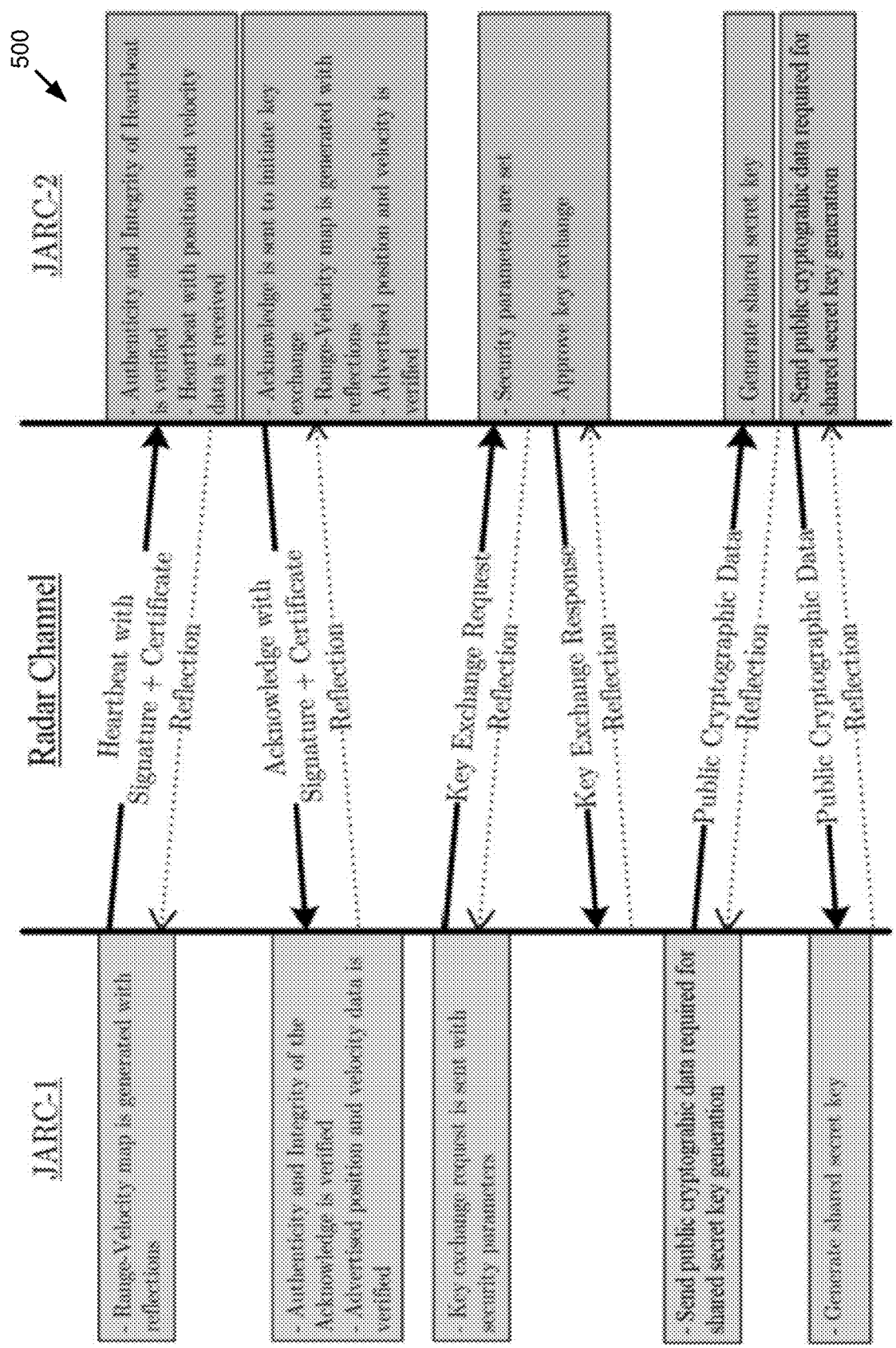
FIG. 5 is a block diagram of an example verified key exchange protocol for JARC communications according to some embodiments.

Various examples of the crypto data 191 are described in FIG. 5 according to some embodiments. For example, FIG. 5 describes an example of a shared secret key which is generated by the security system 199 based on public cryptographic data. In some embodiments, the shared secret key is described by the key data 195 and the public cryptographic data is described by the crypto data 191.

In some embodiments, the crypto data 191 includes any digital data that is necessary for the security system 199 to generate a shared secret key. For example, the crypto data 191 describes the shared secret key depicted in FIG. 5 as being generated based on the public cryptographic data.

In some embodiments, the crypto data 191 includes digital data that describes a one or more of a digital signature and a digital certificate. For example, the crypto data 191 describes the digital signature and the digital certificate depicted in FIG. 5. In some embodiments, the crypto data 191 also describes the public cryptographic data depicted in FIG. 5. Accordingly, in some embodiments the crypto data 191 describes one or more of the various types of cryptographic data depicted in FIG. 5.

The position data 192 includes digital data that describes a geographic location of the ego vehicle 123 or some other object such as the remote vehicle 124.

The velocity data 193 includes digital data that describes a velocity of the ego vehicle 123 or some other object such as the remote vehicle 124.

The ID data 194 includes digital data that describes one or more temporary identifiers. In some embodiments, a temporary identifier is unique relative to other temporary identifiers. The first temporary identifier and the second temporary identifier described herein are examples of temporary IDs which are described by the ID data 194.

The key data 195 includes digital data that describes a key which is used for cryptographic purposes by the security system 199. In some embodiments, the key data 195 describes a shared secret key. In some embodiments, the shared secret key described by the key data 195 is generated by the security system 199. In some embodiments, the security system 199 generates the key data 195 based at least in part on the crypto data 191 and/or some other digital data stored in the memory 127. For example, in some embodiments, the security system 199 generates a shared secret key based on public cryptographic data included in the crypto data 191.

The radar data 196 includes digital data that describes radar measurements and/or the radar signals that are received or transmitted by the radar 146. In some embodiments, the radar data 196 describes the radar reflections depicted in FIG. 5.

The blacklist data 197 includes digital data that describes the temporary identifiers that have been determined to be blacklisted by the security system 199. In some embodiments, the blacklist data 197 is a data structure that describes instances of ID data 194 which are determined to be blacklisted by the security system 199.

The determination data 189 includes digital data that describes the outputs of the determinations made by the security system 199. For example, the determination data 189 describes an authenticity status of the sensor data included in a payload of a wireless communication received by the communication unit 145. The determination data 189 may also describe the determinations of which temporary identifiers to blacklist.

In some embodiments, the determination data 189 describes a determination that an object associated with a particular temporary identifiers is misbehaving or possibly misbehaving.

In some embodiments, the determination data 189 describes a determination of which of the strategies (e.g., strategy 1(a), strategy 1(b), strategy 2(a), strategy 2(b)) the security system 199 should employ for a particular wireless message received by the communication unit 145.

The determination data 189 may describe the output of any determination, step, routine, or process described herein as being made by the security system 199 or a processor 125 which executes the security system 199.

Figure 7:
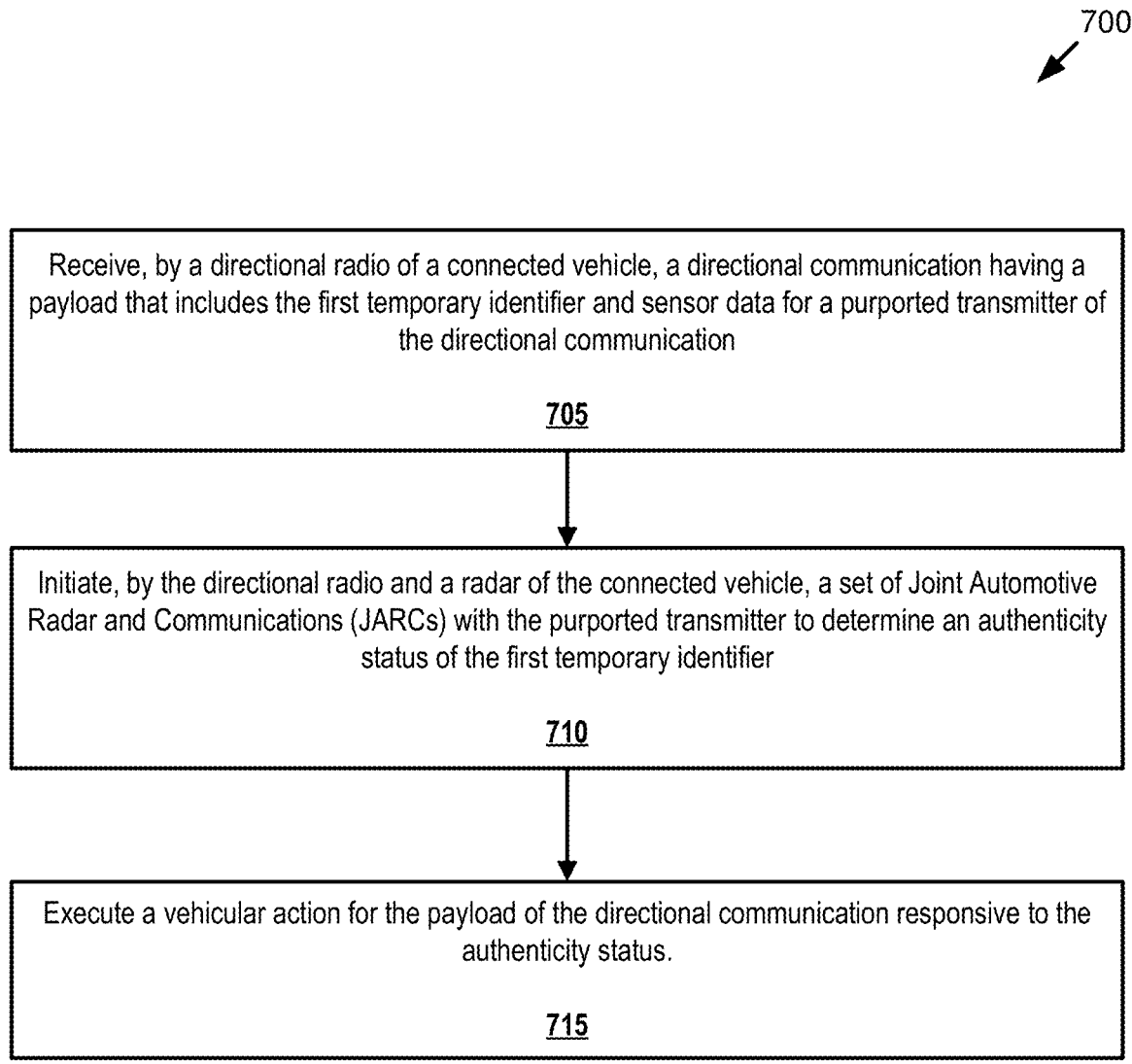
FIG. 7 includes a flowchart of an example method implemented by the security system according to some embodiments.

In some embodiments, the security system 199 includes code and routines that are operable, when executed by the processor 125, to execute one or more steps of one or more of the method 700 depicted in FIG. 7. In some embodiments, the security system 199 includes code and routines that are operable, when executed by the processor 125, to execute one or more steps that are consistent with one or more of the strategies 1(a), 1(b), 2(a), and 2(b) described above. In some embodiments, the security system 199 includes code and routines that are operable, when executed by the processor 125, to execute one or more steps of one or more of the methods depicted in FIG. 3. In some embodiments, the security system 199 includes code and routines that are operable, when executed by the processor 125, to execute one or more steps of the directional JARC network protocol 400 depicted in FIG. 4. In some embodiments, the security system 199 includes code and routines that are operable, when executed by the processor 125, to execute one or more steps of the verified key exchange protocol 500 depicted in FIG. 5.

As depicted, the security system 199 includes the following elements: a determination module 198; the omnidirectional radio 143; the directional radio 144; and the radar 146. As depicted in FIG. 1, the security system 199 is an element of the communication unit 145. In some embodiments, the security system is not an element of the communication unit 145. In some embodiments, the security system 199 and the determination module 198 are stored on the memory 127 and the omnidirectional radio 143, directional radio 144, and radar 146 are elements of the communication unit 145 and/or sensor set 126.

The following elements of the security system 199 were described above with reference to the communication unit 145, and so, those descriptions will not be repeated here: the omnidirectional radio 143; the directional radio 144; and the radar 146.

The determination module 198 includes code and routines that are operable, when executed by the processor 125, to execute steps that provide the functionality of the security system 199. In some embodiments, the determination module 198 includes code and routines that are operable, when executed by the processor 125, to execute one or more steps of one or more of the method 700 depicted in FIG. 7. In some embodiments, the determination module 198 includes code and routines that are operable, when executed by the processor 125, to execute one or more steps that are consistent with one or more of the strategies 1(a), 1(b), 2(a), and 2(b) described above. In some embodiments, the determination module 198 includes code and routines that are operable, when executed by the processor 125, to execute one or more steps of one or more of the methods depicted in FIG. 3. In some embodiments, the determination module 198 includes code and routines that are operable, when executed by the processor 125, to execute one or more steps of the directional JARC network protocol 400 depicted in FIG. 4. In some embodiments, the determination module 198 includes code and routines that are operable, when executed by the processor 125, to execute one or more steps of the verified key exchange protocol 500 depicted in FIG. 5.

Figure 2:
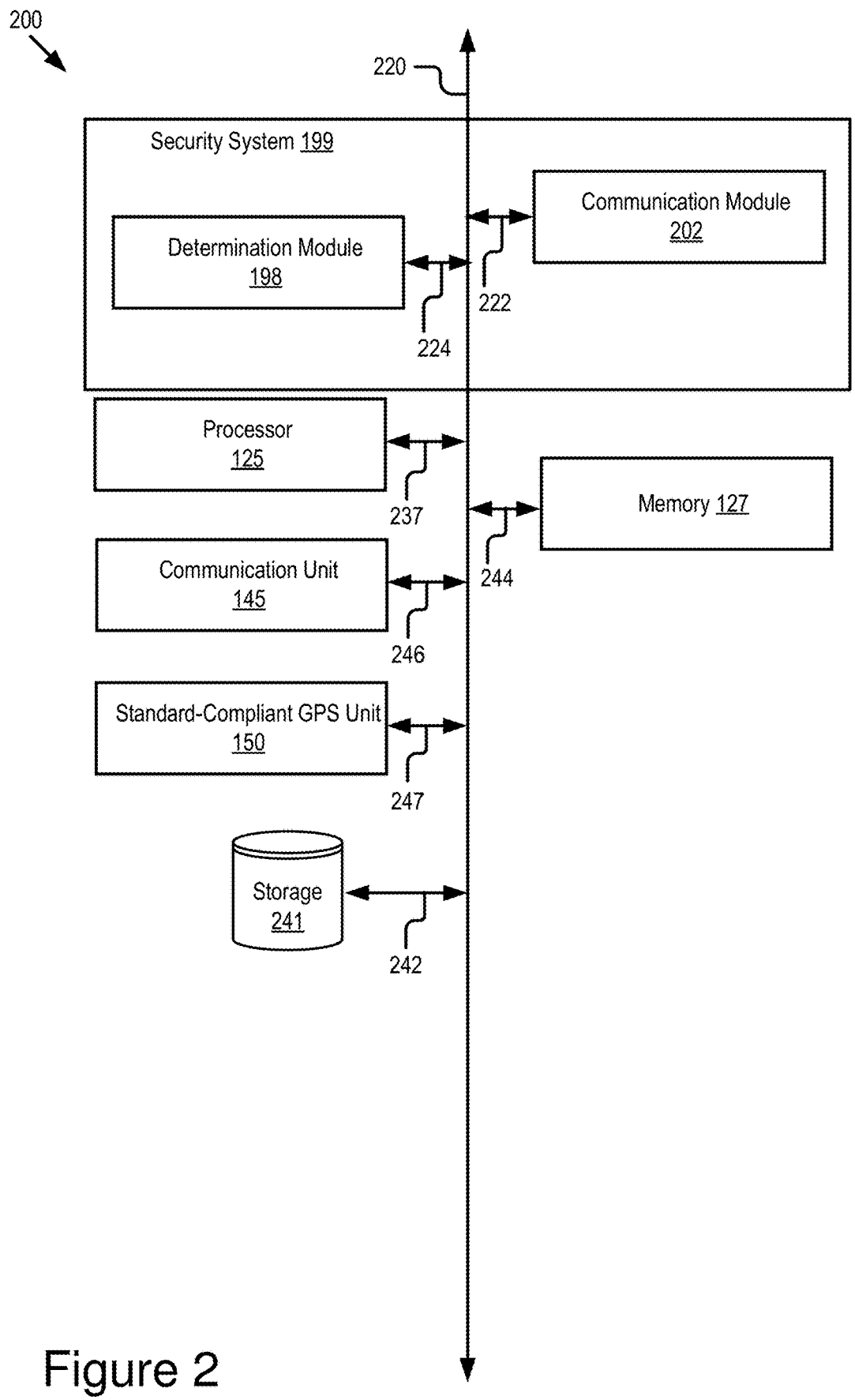
FIG. 2 is a block diagram illustrating an example computer system including a security system according to some embodiments.

In some embodiments, the security system 199 is an element of the onboard unit 139 or some other onboard vehicle computer (see, e.g., FIG. 2).

In some embodiments, the security system 199 is implemented using hardware including a field-programmable gate array ("FPGA") or an application-specific integrated circuit ("ASIC"). In some other embodiments, the security system 199 is implemented using a combination of hardware and software.

The remote vehicle 124 includes elements and functionality which are similar to those described above for the ego vehicle 123, and so, those descriptions will not be repeated here. In some embodiments, the ego vehicle 123 and the remote vehicle 124 are located in a same geographic region.

In some embodiments, the wireless messages described herein may be encrypted themselves or transmitted via an encrypted communication provided by the network 105. In some embodiments, the network 105 may include an encrypted virtual private network tunnel ("VPN tunnel") that does not include any infrastructure components such as network towers, hardware servers or server farms. In some embodiments, the security system 199 includes encryption keys for encrypting wireless messages and decrypting the wireless messages described herein.

Referring now to FIG. 2, depicted is a block diagram illustrating an example computer system 200 including a security system 199 according to some embodiments.

In some embodiments, the computer system 200 may include a special-purpose computer system that is programmed to perform one or more steps of one or more of the methods, protocols, and strategies described herein.

In some embodiments, the computer system 200 may include a processor-based computing device. For example, the computer system 200 may include an onboard vehicle computer system of the ego vehicle 123 or the remote vehicle 124.

The computer system 200 may include one or more of the following elements according to some examples: the security system 199; a processor 125; a communication unit 145; a standard-compliant GPS unit 150; a storage 241; and a memory 127. The components of the computer system 200 are communicatively coupled by a bus 220.

In the illustrated embodiment, the processor 125 is communicatively coupled to the bus 220 via a signal line 237. The communication unit 145 is communicatively coupled to the bus 220 via a signal line 246. The standard-compliant GPS unit 150 is communicatively coupled to the bus 220 via a signal line 247. The storage 241 is communicatively coupled to the bus 220 via a signal line 242. The memory 127 is communicatively coupled to the bus 220 via a signal line 244.

The following elements of the computer system 200 were described above with reference to FIG. 1, and so, these descriptions will not be repeated here: the processor 125; the communication unit 145; the standard-compliant GPS unit 150; and the memory 127.

The storage 241 can be a non-transitory storage medium that stores data for providing the functionality described herein. The storage 241 may be a DRAM device, a SRAM device, flash memory, or some other memory devices. In some embodiments, the storage 241 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the security system 199 includes code and routines that are operable, when executed by the processor 125, to cause the processor 125 to execute one or more steps of one or more of the methods, protocols, and strategies described herein.

In the illustrated embodiment shown in FIG. 2, the security system 199 includes a communication module 202 and the determination module 198.

The determination module 198 is communicatively coupled to the bus 220 via the signal line 224. The determination module 198 was described above with reference to FIG. 1, and so, that description will not be repeated here.

The communication module 202 can be software including routines for handling communications between the security system 199 and other components of the computer system 200. In some embodiments, the communication module 202 can be a set of instructions executable by the processor 125 to provide the functionality described below for handling communications between the security system 199 and other components of the computer system 200. In some embodiments, the communication module 202 can be stored in the memory 127 of the computer system 200 and can be accessible and executable by the processor 125. The communication module 202 may be adapted for cooperation and communication with the processor 125 and other components of the computer system 200 via signal line 222.

The communication module 202 sends and receives data, via the communication unit 145, to and from one or more elements of the operating environment 100.

In some embodiments, the communication module 202 receives data from components of the security system 199 and stores the data in one or more of the storage 241 and the memory 127.

In some embodiments, the communication module 202 may handle communications between components of the security system 199 or the computer system 200.

Figure 3:
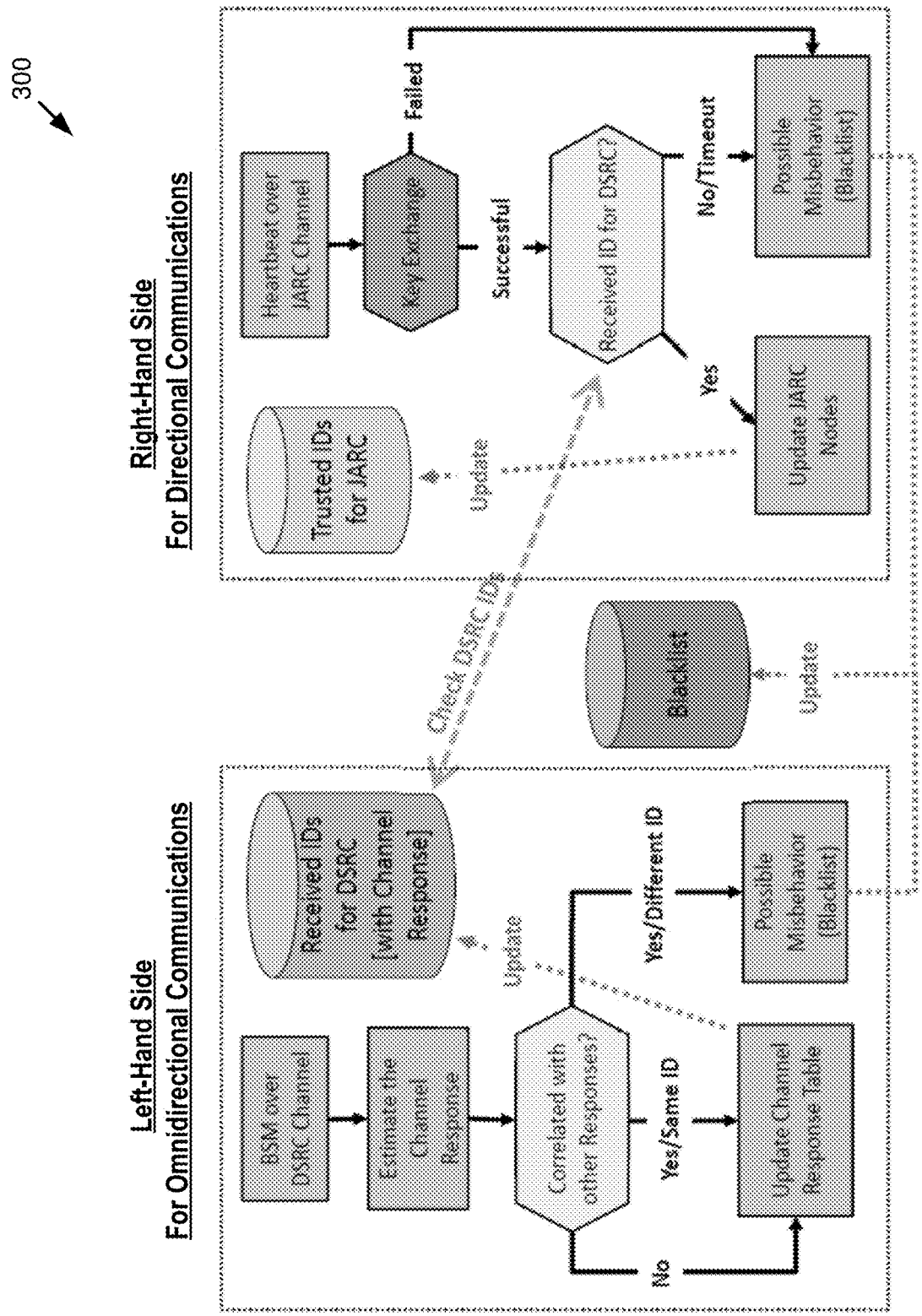
FIG. 3 includes two flowcharts of two example methods implemented by the security system according to some embodiments.

Referring now to FIG. 3, depicted is two flowcharts 300 of two example methods implemented by the security system 199 according to some embodiments.

All references in the accompanying drawings to DSRC, BSM, JARC, and mmWave are intended to be illustrative and not limiting. For example, DSRC and BSM are examples of omnidirectional communications according to some embodiments and mmWave and JARC are examples of directional communications according to some embodiments.

In some embodiments, the security system includes code and routines that are operable, when executed by the onboard unit, to cause the onboard unit to execute one or more steps of one or more of the methods depicted in FIG. 3. The security system receives a wireless message determines whether the wireless message is an omnidirectional communication or directional communication.

If the security system determines that the wireless message is an omnidirectional communication, then the security system causes the onboard unit to execute the method depicted on the left-hand side of FIG. 3. Note that BSMs and DSRC are examples of omnidirectional communications according to some embodiments and reference to these types of omnidirectional communications is not intended to be limiting.

If the security system determines that the wireless message is a directional communication, then the security system causes the onboard unit to execute the method depicted on the right-hand side of FIG. 3. Note that heartbeat messages received over a JARC channel is an example of a directional communication according to some embodiments and reference to this type directional communication is not intended to be limiting.

In some embodiments, both methods depicted in FIG. 3 operate collaboratively with one another.

A DSRC ID is an example of a temporary identifier such as might be described by the ID data 194. Each DSRC message includes such a temporary identifier of the original transmitter of the DSRC message. The dotted line depicted in the middle of FIG. 3 ("Check DSRC IDs") is an example of how the security system compares temporary identifiers generated by both omnidirectional and directional messages. No existing solution performs this comparison. No existing solution executes the method depicted on the left-hand side of FIG. 3 for omnidirectional communications.

The right-hand side of FIG. 3 is explained in more detail below with regards to FIGS. 4 and 5. Note that FIG. 5 places emphasis on the "Key Exchange" block depicted on the right-hand side of FIG. 5.

Figure 4:
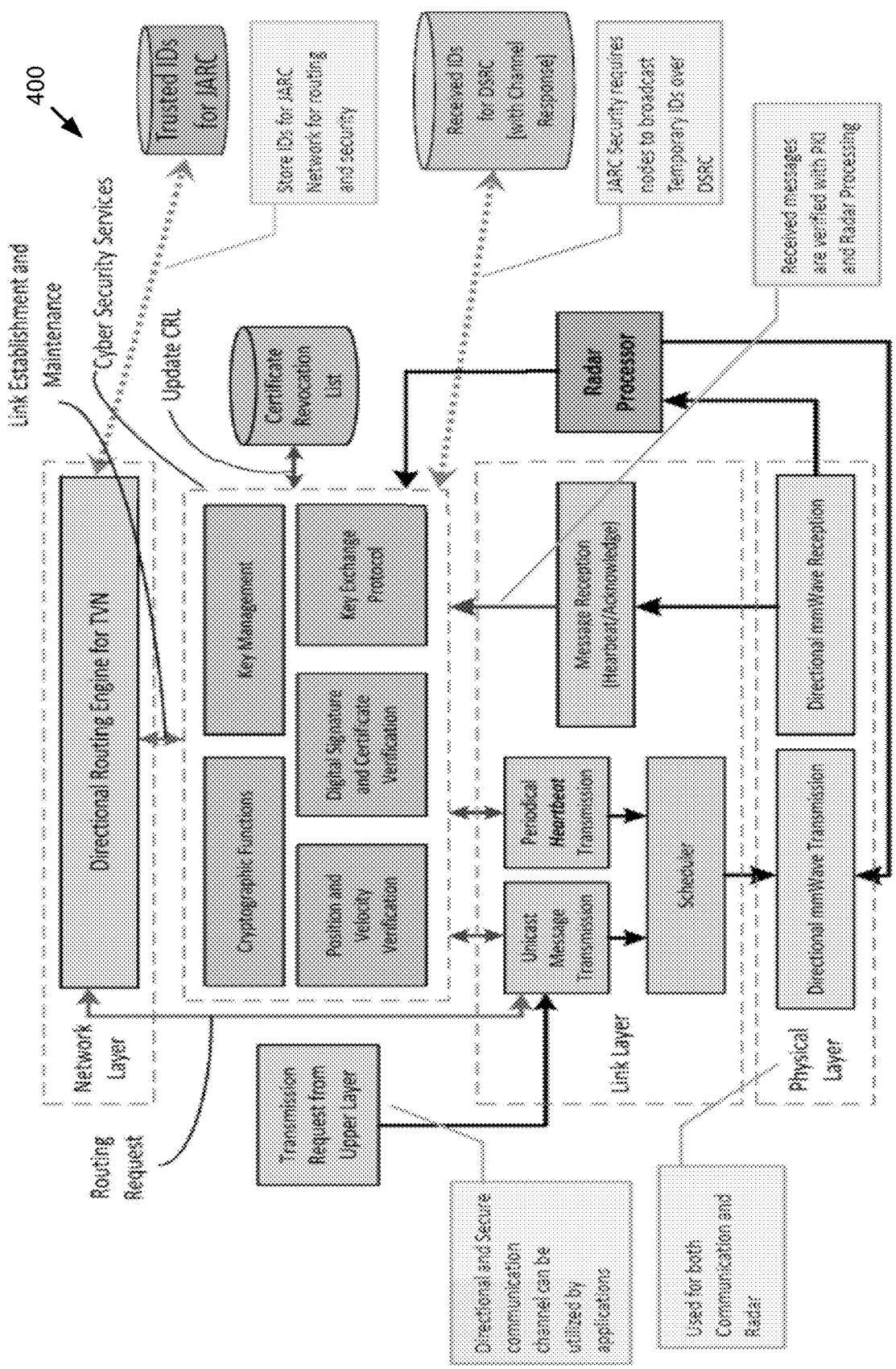
FIG. 4 includes an example of a directional JARC network protocol according to some embodiments.

Referring now to FIG. 4, depicted is an example of a directional JARC network protocol 400 according to some embodiments. As used in FIG. 4, "TVN" refers to a trust-and-verify network which is provided by implementation of the security system across a threshold number of vehicles within a geographic region. "PKI" refers to a public key infrastructure. "CRL" refers to a certificate revocation list.

Referring now to FIG. 5, depicted is an example verified key exchange protocol 500 for JARC communications according to some embodiments. Note that FIG. 5 places emphasis on the "Key Exchange" block depicted on the right-hand side of FIG. 5. If FIG. 5 is mapped to FIG. 1, then "JARC 1" as depicted in FIG. 5 corresponds to the ego vehicle depicted in FIG. 1 and "JARC 2" as used in FIG. 5 corresponds to a remote vehicle depicted in FIG. 1 whose identity the ego vehicle is trying to determine and verify against another temporary identifier which was received via an omnidirectional communication as depicted in FIG. 4.

Figure 6:
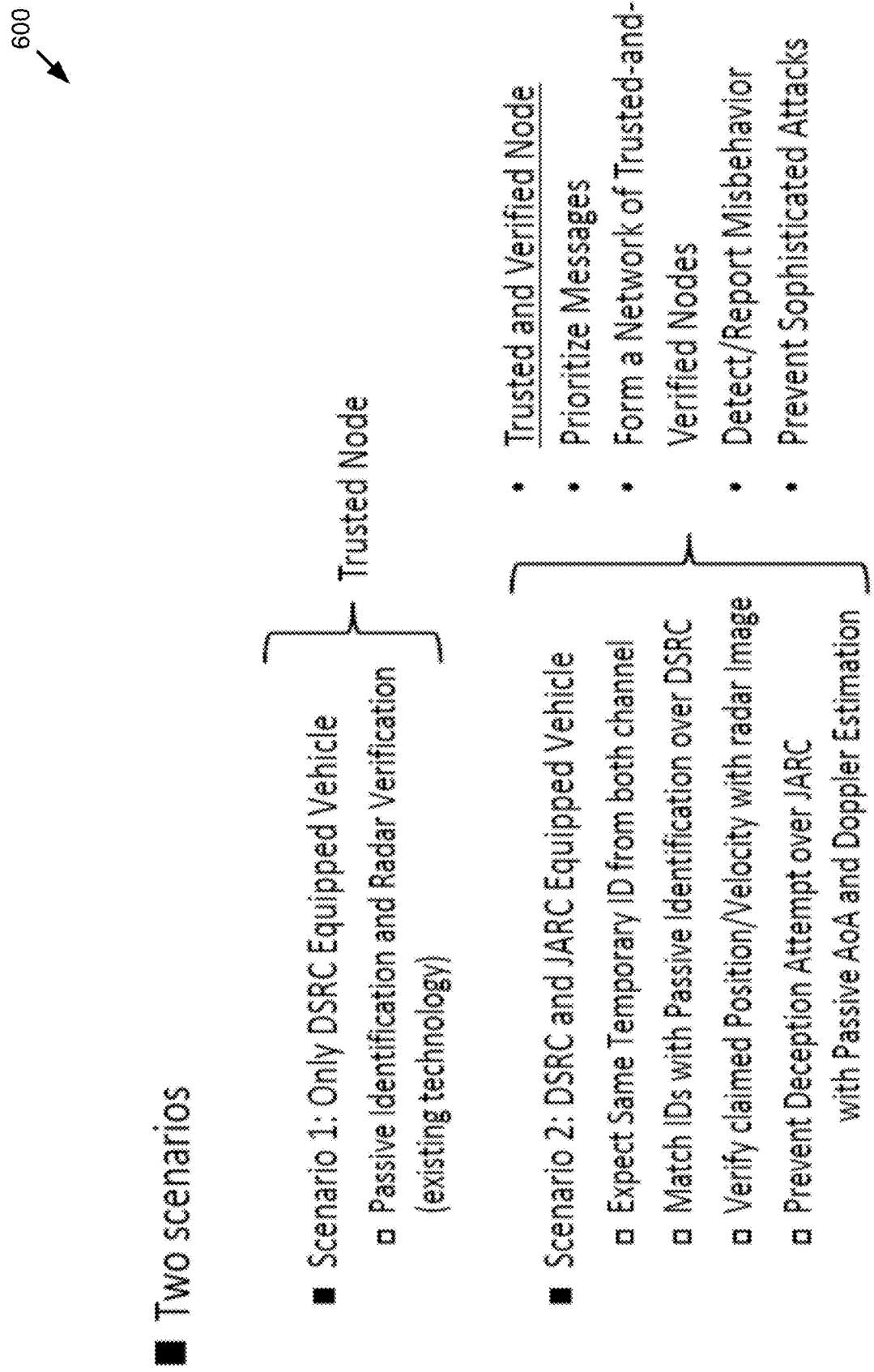
FIG. 6 is a block diagram depicting example scenarios and example benefits of the security system according to some embodiments.

Referring now to FIG. 6, depicted is example scenarios and example benefits 600 of the security system according to some embodiments. Scenario 2 refers to the functionality of the security system and scenario 1 does not.

Scenario 1 depicts the current existing technology whereby V2X-equipped vehicles are anonymously identified using temporary identifiers which are included in V2X messages and the existence of this vehicle at a particular location (which is itself described by location data in the V2X message) is confirmed by a V2X message recipient using radar measurements or some other range finder. The V2X transmitter, once their location is confirmed by radar measurements, is then considered a trusted node. This is why to the right of Scenario 1 the words "Trusted Node" are written. However, note that any vehicle could have actually transmitted the V2X message and included that particular instance of location data, so, this form of identification is unreliable. In some embodiments, the security system solves this problem by implementing new functionality as described in Scenario 2.

Scenario 2 depicts an example embodiment of the security system. Note that the security system provides more benefits than those depicted for Scenario 1. This is because the security system provides greater certainty that a vehicle at a particular location is in fact the transmitter of a V2X message (whether it is directional or omnidirectional). Because of this, the security system enables the benefits that are depicted to the right of Scenario 2

Referring now to FIG. 7, depicted is an example method 700 implemented by the security system according to some embodiments. The steps of the method 700 may be executed in any order, and not necessarily those depicted in FIG. 7. In some embodiments, one or more of the steps are skipped or modified in ways that are described herein or known or otherwise determinable by those having ordinary skill in the art. The method includes steps 705, 710, and 715. In some embodiments, the method 700 is modified to include some or all of the steps described below with reference to the claims.

In the above description, for purposes of explanation, numerous specific details are set forth in order to provide a thorough understanding of the specification. It will be apparent, however, to one skilled in the art that the disclosure can be practiced without these specific details. In some instances, structures and devices are shown in block diagram form in order to avoid obscuring the description. For example, the present embodiments can be described above primarily with reference to user interfaces and particular hardware. However, the present embodiments can apply to any type of computer system that can receive data and commands, and any peripheral devices providing services.

Reference in the specification to "some embodiments" or "some instances" means that a particular feature, structure, or characteristic described in connection with the embodiments or instances can be included in at least one embodiment of the description. The appearances of the phrase "in some embodiments" in various places in the specification are not necessarily all referring to the same embodiments.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission, or display devices.

The present embodiments of the specification can also relate to an apparatus for performing the operations herein. This apparatus may be specially constructed for the required purposes, or it may include a general-purpose computer selectively activated or reconfigured by a computer program stored in the computer. Such a computer program may be stored in a computer-readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory, or any type of media suitable for storing electronic instructions, each coupled to a computer system bus.

The specification can take the form of some entirely hardware embodiments, some entirely software embodiments or some embodiments containing both hardware and software elements. In some preferred embodiments, the specification is implemented in software, which includes, but is not limited to, firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

A data processing system suitable for storing or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including, but not limited, to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem, and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions, or formats. Furthermore, as will be apparent to one of ordinary skill in the relevant art, the modules, routines, features, attributes, methodologies, and other aspects of the disclosure can be implemented as software, hardware, firmware, or any combination of the three. Also, wherever a component, an example of which is a module, of the specification is implemented as software, the component can be implemented as a standalone program, as part of a larger program, as a plurality of separate programs, as a statically or dynamically linked library, as a kernel-loadable module, as a device driver, or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustra-

What is claimed is:

1. A method for out-of-band authentication of a first temporary identifier, the method comprising:
receiving, by a directional radio of a connected vehicle, a directional communication having the first temporary identifier and sensor data for a purported transmitter of the directional communication;
initiating, by the directional radio and a radar of the connected vehicle, a set of Joint Automotive Radar and Communications (JARCs) with the purported transmitter to determine an authenticity status of the first temporary identifier; and
executing a vehicular action responsive to the authenticity status.

2. The method of claim 1, wherein:
the authenticity status is negative based on the set of JARCs indicating that a second temporary identifier received based on the set of JARCs does not match the first temporary identifier.

3. The method of claim 2, wherein the vehicular action further comprises ignoring future communications that include one or more of the first temporary identifier and the second temporary identifier.

4. The method of claim 1, wherein the directional communication is received by the directional radio in a millimeter wave band and further comprising determining a receipt status of a second omnidirectional message including a second temporary identifier for the purported transmitter, wherein the second omnidirectional message is required to be received by an omnidirectional radio of the connected vehicle via a directional communication in a band which is outside of the millimeter wave band.

5. The method of claim 4, wherein:
the receipt status is negative based on the second temporary identifier not being received.

6. The method of claim 4, wherein:
the receipt status is negative based on the second temporary identifier being received in the millimeter wave band.

7. The method of claim 4 further comprising comparing the first temporary identifier to the second temporary identifier, wherein:
the receipt status is negative based on the second temporary identifier not matching the first temporary identifier.

8. The method of claim 4, further comprising estimating a second channel response of the second omnidirectional message and comparing the second channel response with a first channel response of a previously received omnidirectional message, wherein:
the receipt status is negative based on the second channel response not matching the first channel response.

9. The method of claim 1, wherein the sensor data describes a location and a velocity of the purported transmitter and the set of JARCs are operable to verify the location and the velocity described by the sensor data.

10. The method of claim 1, wherein the purported transmitter is a non-vehicular endpoint.

11. A computer program product installed in an onboard unit of a connected vehicle, the computer program product including codes and routines that are operable, when executed by the onboard unit, to cause the onboard unit to execute routines including:
receiving, by a directional radio of a connected vehicle, a directional communication having a first temporary identifier and sensor data for a purported transmitter of the directional communication;
initiating, by the directional radio and a radar of the connected vehicle, a set of Joint Automotive Radar and Communications (JARCs) with the purported transmitter to determine an authenticity status of the first temporary identifier; and
executing a vehicular action responsive to the authenticity status.

12. The computer program product of claim 11, wherein:
the authenticity status is negative based on the set of JARCs indicating that a second temporary identifier received based on the set of JARCs does not match the first temporary identifier.

13. The computer program product of claim 12, wherein the vehicular action further comprises ignoring future communications that include one or more of the first temporary identifier and the second temporary identifier.

14. The computer program product of claim 11, wherein the directional communication is received by the directional radio in a millimeter wave band and further comprising determining a receipt status of a second omnidirectional message including a second temporary identifier for the purported transmitter, wherein the second omnidirectional message is required to be received by a omnidirectional radio of the connected vehicle via a directional communication in a band which is outside of the millimeter wave band.

15. The computer program product of claim 14, wherein:
the receipt status is negative based on the second temporary identifier not being received.

16. A system of a connected vehicle comprising:
a processor communicatively coupled to a non-transitory memory, a directional radio, and a radar of the connected vehicle, wherein the processor is operable to retrieve computer-executable code from the non-transitory memory which is operable, when executed by the processor, to cause the processor to:
receive, by the directional radio, a directional communication having a first temporary identifier and sensor data for a purported transmitter of the directional communication;
initiate, by the directional radio and the radar, a set of Joint Automotive Radar and Communications (JARCs) with the purported transmitter to determine an authenticity status of the first temporary identifier; and
execute a vehicular action responsive to the authenticity status.

17. The system of claim 16, wherein:
the authenticity status is negative based on the set of JARCs indicating that a second temporary identifier received based on the set of JARCs does not match the first temporary identifier.

18. The system of claim 17, wherein the vehicular action further comprises ignoring future communications that include one or more of the first temporary identifier and the second temporary identifier.

19. The system of claim 16, wherein the directional communication is received by the directional radio in a millimeter wave band and further comprising determining a receipt status of a second omnidirectional message including a second temporary identifier for the purported transmitter, wherein the second omnidirectional message is required to be received by a omnidirectional radio of the connected vehicle via a directional communication in a band which is outside of the millimeter wave band, wherein the omnidirectional radio is communicatively coupled to the processor.

20. The system of claim 19, wherein:
the receipt status is negative based on the second temporary identifier not being received.

* * * * *